(12) United States Patent
Kawazoe et al.

(10) Patent No.: US 8,668,983 B2
(45) Date of Patent: *Mar. 11, 2014

(54) EPOXY RESIN COMPOSITION FOR FIBER REINFORCED COMPOSITE MATERIAL

(75) Inventors: Masayuki Kawazoe, Hiratsuka (JP); Hiroyuki Okuhira, Hiratsuka (JP); Koichiro Miyoshi, Hiratsuka (JP); Tomohiro Ito, Hiratsuka (JP); Takashi Kousaka, Hiratsuka (JP); Mitsuhiro Iwata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 12/519,037

(22) PCT Filed: Dec. 12, 2007

(86) PCT No.: PCT/JP2007/074348
§ 371 (c)(1),
(2), (4) Date: Sep. 8, 2009

(87) PCT Pub. No.: WO2008/072769
PCT Pub. Date: Jun. 19, 2008

(65) Prior Publication Data
US 2010/0062211 A1   Mar. 11, 2010

(30) Foreign Application Priority Data

Dec. 13, 2006   (JP) .................................. 2006-335837

(51) Int. Cl.
*B32B 17/04* (2006.01)
*B32B 27/04* (2006.01)
*C08K 7/02* (2006.01)
*C08K 7/04* (2006.01)
*C08K 7/14* (2006.01)

(52) U.S. Cl.
USPC ........ 428/297.4; 428/394; 428/396; 428/413; 523/427; 523/428; 523/434

(58) Field of Classification Search
None
See application file for complete search history.

(56) References Cited

U.S. PATENT DOCUMENTS

| | | | | |
|---|---|---|---|---|
| 3,509,086 A | * | 4/1970 | Rohrbacher | 523/400 |
| 5,476,908 A | | 12/1995 | Kishi et al. | |
| 5,922,414 A | * | 7/1999 | Gabriele | 427/487 |
| 6,399,199 B1 | * | 6/2002 | Fujino et al. | 428/396 |
| 6,447,915 B1 | * | 9/2002 | Komiyatani et al. | 428/416 |

FOREIGN PATENT DOCUMENTS

| | | | |
|---|---|---|---|
| EP | 0311349 | | 4/1989 |
| EP | 0382575 | | 8/1990 |
| EP | 1452566 | | 9/2004 |
| JP | 61-113084 A | * | 5/1986 |
| JP | 2-305860 A | | 12/1990 |
| JP | 2003-2990 A | * | 1/2003 |
| JP | 2004-277481 A | * | 10/2004 |
| JP | 2005-272672 A | * | 10/2005 |
| JP | 2005-281611 A | * | 10/2005 |
| JP | 2006-219093 A | * | 8/2006 |
| JP | 2006-219094 A | * | 8/2006 |
| JP | 2007-126637 A | * | 5/2007 |
| JP | 2007-297547 A | * | 11/2007 |
| JP | 2007-297549 A | * | 11/2007 |
| JP | 2007-297547 A | * | 12/2007 |

OTHER PUBLICATIONS

Kukdo technical data sheet for YD-020 Standard Solid Epoxy Resin, Dec. 1, 2004, one page.*

* cited by examiner

*Primary Examiner* — Robert Sellers
(74) *Attorney, Agent, or Firm* — Novak Druce Connolly Bove + Quigg LLP

(57) ABSTRACT

The present invention provides an epoxy resin composition for a fiber reinforced composite material comprising an epoxy resin (A) comprising an epoxy resin (a1) having a weight average molecular weight of up to 1,000 and an epoxy resin (a2) having a weight average molecular weight of 10,000 to 100,000 which contains at least 20% by weight of the basic skeleton of the epoxy resin (a1), a thermoplastic resin (B), and a curing agent (C). The cured composition has a co-continuous phase of the epoxy resin (A) and the thermoplastic resin (B) and/or a continuous phase of the thermoplastic resin (B). A cured product having a high toughness can be obtained from this epoxy resin composition.

4 Claims, 3 Drawing Sheets

EPOXY RESIN COMPOSITION FOR FIBER REINFORCED COMPOSITE MATERIAL

CROSS REFERENCE TO RELATED APPLICATIONS

This application is a national phase of PCT/JP2007/074348, filed on Dec. 12, 2007, which claims priority to JP 2006-335837, filed on Dec. 13, 2006, the entire contents of which are incorporated herein by reference in their entireties.

TECHNICAL FIELD

This invention relates to an epoxy resin composition for a fiber reinforced composite material.

BACKGROUND ART

Fiber reinforced composite materials produced by using an epoxy resin composition for their matrix resin are used in a wide variety of industrial applications including aircrafts and automobiles since they have excellent mechanical properties. In particular, fiber reinforced composite materials are finding an increasing use for a surface plate of a honeycomb panel in structural materials and interior materials of aircrafts to respond to weight reduction requirements.

In the production of honeycomb panels, further reduction in weight and cost is currently required, and there is a strong demand for the so-called "self-adhesion technique" in which the honeycomb core and the prepreg are directly adhered.

In order to realize such "self-adhesion" of a prepreg, juncture of the honeycomb core and the prepreg is wetted by the resin from the prepreg in the course of curing by heating to thereby form a resin reservoir called "fillet".

JP 2-305860 A discloses an attempt to provide a thermosetting resin composition, a cured product thereof, and a prepreg and a fiber reinforced plastic produced by using such resin composition for the matrix resin, which exhibits excellent properties such as high toughness, high elongation, and low internal stress simultaneously with high strength, high modulus, low water absorption, high heat resistance, and good working efficiency, and wherein such properties are highly stable. More specifically, JP 2-305860 A discloses "a resin composition comprising the following components [A], [B], and [C]:

[A]: thermosetting resin,
[B]: curing agent, and
[C]: thermoplastic resin as its critical components, wherein the component [C] is a block copolymer or a graft copolymer comprising a chain compatible with the component [A] or [B] and a chain incompatible with the component [A] or [B]".

DISCLOSURE OF THE INVENTION

However, the inventors of the present invention found that, when a honeycomb and a prepreg are directly adhered by using the composition like the one described in JP 2-305860 A for the matrix resin of the prepreg, the fillets formed are insufficient in strength, and the resulting cured product had unsatisfactory toughness.

A fillet is formed by the resin from the prepreg. The fillet sags or rises along the wall of the honeycomb in the thickness direction of the honeycomb core, and the shape of the fillet is heavily related to the viscosity of the resin while its strength depends on the toughness of the matrix resin constituting the prepreg.

In view of the situation as described above, an object of the present invention is to provide an epoxy resin composition for a fiber reinforced composite material which can be used in producing a cured product having high toughness.

The inventors of the present invention have made an intensive study to solve the problems as described above, and found that a cured product obtained by curing an epoxy resin composition containing a particular epoxy resin, a thermoplastic resin, and a curing agent has a particular morphology with high toughness. The present invention has been completed on the bases of such finding.

Accordingly, the present invention provides the following (1) to (17).

(1) An epoxy resin composition for a fiber reinforced composite material comprising:

an epoxy resin (A) comprising an epoxy resin (a1) having a weight average molecular weight of up to 1,000 and an epoxy resin (a2) having a weight average molecular weight of 10,000 to 100,000 which contains at least 20% by weight of the basic skeleton of the epoxy resin (a1), a thermoplastic resin (B), and a curing agent (C), wherein the cured composition has a co-continuous phase of the epoxy resin (A) and the thermoplastic resin (B) and/or a continuous phase of the thermoplastic resin (B).

(2) The epoxy resin composition for a fiber reinforced composite material according to the above (1) wherein the basic skeleton in the epoxy resin (a2) is at least one member selected from the group consisting of bisphenol A, bisphenol F, and a copolymer thereof.

(3) The epoxy resin composition for a fiber reinforced composite material according to the above (1) or (2) wherein the epoxy resin (a1) is included in an amount of 7 to 70 parts by weight in relation to 100 parts by weight of the epoxy resin (A) excluding the epoxy resin (a2), and the epoxy resin (a2) is added in an amount of 2 to 20 parts by weight in relation to 100 parts by weight of the epoxy resin (A) excluding the epoxy resin (a2).

(4) The epoxy resin composition for a fiber reinforced composite material according to any one of the above (1) to (3) wherein the epoxy resin (A) further comprises an epoxy resin (a3) having a functionality of at least 3.

(5) The epoxy resin composition for a fiber reinforced composite material according to any one of the above (1) to (4) wherein the epoxy resin (a3) is included in an amount of 30 to 90 parts by weight in relation to 100 parts by weight of the epoxy resin (A) excluding the epoxy resin (a2).

(6) The epoxy resin composition for a fiber reinforced composite material according to any one of the above (1) to (5) wherein the thermoplastic resin (B) has a reactive functional group at an end of the molecule.

(7) The epoxy resin composition for a fiber reinforced composite material according to any one of the above (1) to (6) wherein the thermoplastic resin (B) comprises polyethersulfone resin particles and/or polyetherimide resin particles having an average particle diameter of up to 200 μm.

(8) The epoxy resin composition for a fiber reinforced composite material according to any one of the above (1) to (7) wherein the thermoplastic resin (B) is added in an amount of 20 to 60 parts by weight in relation to 100 parts by weight of the epoxy resin (A) excluding the epoxy resin (a2).

(9) The epoxy resin composition for a fiber reinforced composite material according to any one of the above (1) to (8) wherein diaminodiphenylsulfone and/or a latent curing agent is used for the curing agent (C).

(10) The epoxy resin composition for a fiber reinforced composite material according to any one of the above (1) to (9)

wherein the curing agent (C) is added in an amount of 20 to 60 parts by weight in relation to 100 parts by weight of the epoxy resin (A) excluding the epoxy resin (a2).

(11) The epoxy resin composition for a fiber reinforced composite material according to any one of the above (1) to (10) wherein the composition has a minimum viscosity of 10 to 150 Pa·s when determined by dynamic viscoelasticity measurement at a temperature elevation rate of 2° C./min.

(12) The epoxy resin composition for a fiber reinforced composite material according to any one of the above (1) to (11) wherein the cured composition has a fracture toughness as measured by ASTM D5045-99 of at least 2.0 MPa·m$^{1/2}$.

(13) A fiber reinforced prepreg produced by combining a reinforcing fiber with the epoxy resin composition for a fiber reinforced composite material of any one of the above (1) to (12) serving as a matrix resin.

(14) The fiber reinforced prepreg according to the above (13) wherein the matrix resin is included in an amount of 30 to 50% by weight of the fiber reinforced prepreg.

(15) The fiber reinforced prepreg according to the above (13) or (14) wherein the reinforcing fiber is carbon fiber.

(16) A honeycomb sandwich panel produced by laminating the fiber reinforced prepreg of any one of the above (13) to (15) and a honeycomb core followed by curing.

(17) The honeycomb sandwich panel according to the above (16) wherein the honeycomb core is at least one member selected from the group consisting of aramid honeycomb core, aluminum honeycomb core, paper honeycomb core, and glass honeycomb core.

The epoxy resin composition for a fiber reinforced composite material of the present invention can provide a cured product having a high toughness.

BEST MODE FOR CARRYING OUT THE INVENTION

Figure 1:
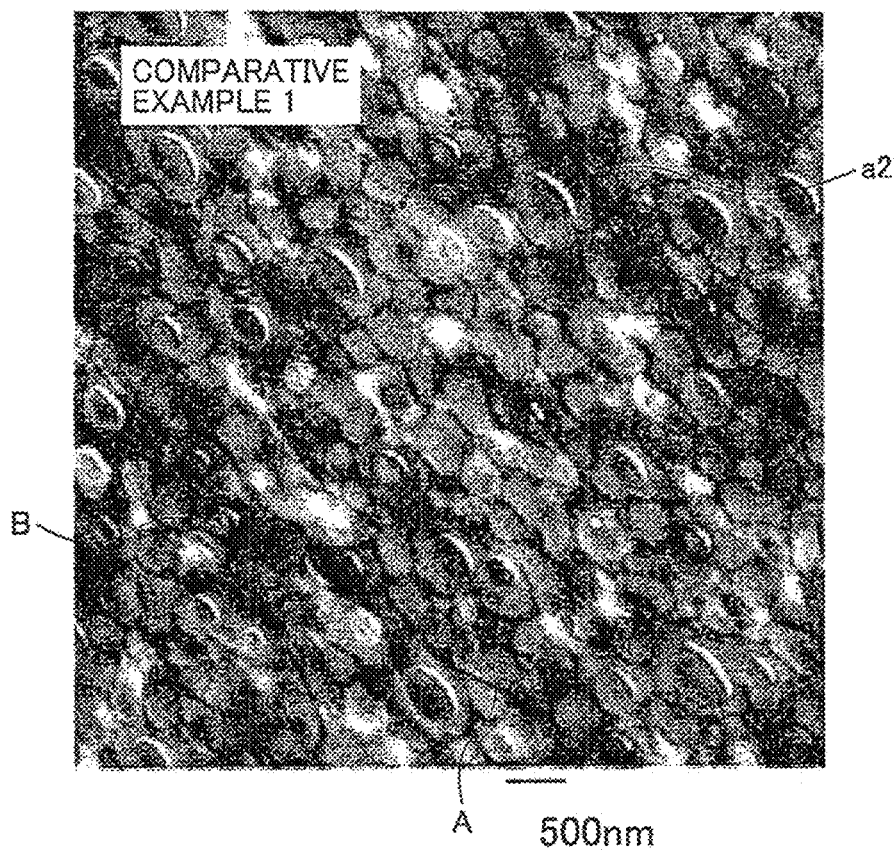
FIG. 1 is a photograph of a cross section of the test sample of Comparative Example 1 taken by a transmission electron microscope at a magnification of 5,000×.

Next, the present invention is described in detail.

First, the epoxy resin composition for a fiber reinforced composite material of the present invention is described.

The epoxy resin composition for a fiber reinforced composite material of the present invention is a composition comprising:

an epoxy resin (A) comprising an epoxy resin (a1) having a weight average molecular weight of up to 1,000 and an epoxy resin (a2) having a weight average molecular weight of 10,000 to 100,000 which contains at least 20% by weight of the basic skeleton of the epoxy resin (a1), a thermoplastic resin (B), and a curing agent (C), wherein the cured composition has a co-continuous phase of the epoxy resin (A) and the thermoplastic resin (B) and/or a continuous phase of the thermoplastic resin (B).

Such composition is hereinafter sometimes referred to as "the composition of the present invention".

In the composition of the present invention, the epoxy resin (A) comprises an epoxy resin (a1) and an epoxy resin (a2).

First, the epoxy resin (a1) is described.

The epoxy resin (a1) contained in the epoxy resin (A) is not particularly limited as long as it is a compound having at least two epoxy groups and it has a weight average, molecular weight of up to 1,000.

Examples of the epoxy resin (a1) include difunctional glycidyl ether epoxy resins such as bisphenol A, bisphenol F (for example, the bisphenol F epoxy resin is represented by the following formula (1)), brominated bisphenol A, hydrogenated bisphenol A, bisphenol S, bisphenol AF, an epoxy compound having bisphenyl group such as biphenyl epoxy resin, polyalkylene glycol epoxy compound, alkylene glycol epoxy compound, an epoxy compound having naphthalene ring, and an epoxy compound having fluorene group; polyfunctional glycidyl ether epoxy resins such as phenol novolac epoxy resin, ortho-cresol novolac epoxy resin, trishydroxyphenylmethane epoxy resin, trifunctional epoxy resin, and tetraphenylolethane epoxy, resin; a glycidyl ester epoxy resin of a synthetic fatty acid such as dimer acid; aromatic epoxy resins having glycidylamino group such as N,N,N',N' tetraglycidyldiaminodiphenylmethane (TGDDM), tetraglycidyl-m-xylenediamine, triglycidyl-p-aminophenol, and N,N-diglycidylaniline; an epoxy compound having tricyclo[5.2.1.0$^{2,6}$] decane ring; an alicyclic epoxy resin; epoxy resins having sulfur atom in the backbone of the epoxy resin as typically represented by FLEP 10 manufactured by Toray Thiokol Co., Ltd.; a urethane-modified epoxy resin having urethane bond; and rubber-modified epoxy resins containing polybutadiene, liquid polyacrylonitrile-butadiene rubber, or acrylonitrile butadiene rubber (NBR).

(1)
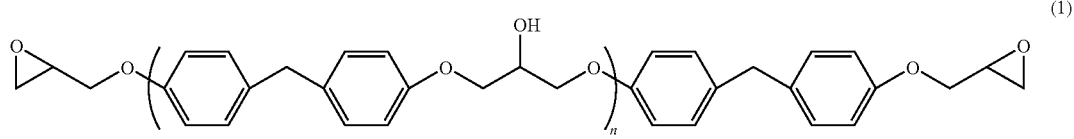

n = 0 ~ 2

Among these, the epoxy resin (a1) is preferably a bisphenol A epoxy resin or a bisphenol F epoxy resin in view of working efficiency and heat resistance of the cured product.

The epoxy resin (a1) may preferably have a weight average molecular weight of 300 to 1,000, and more preferably 300 to 500 in view of homogeneous dissolution of the composition.

In the present invention, the weight average molecular weight is the one measured by GPC analysis.

In addition, the epoxy resin (a1) is preferably liquid in view of homogeneous dissolution of the composition, and adjusting the viscosity of the composition to an adequate range.

The epoxy resin (a1) may preferably have a viscosity at 25° C. of 5 to 150 poises, and more preferably 5 to 100 poises.

In the present invention, the viscosity is the one measured according to JIS K 6862.

The epoxy resins (a1) as mentioned above may be used alone or in combination of two or more.

The epoxy resin (a1) is preferably included in an amount of 7 to 70 parts by weight, and more preferably 20 to 50 parts by weight in relation to 100 parts by weight of the epoxy resin (A) excluding the epoxy resin (a2) in view of the heat resistance of the cured product.

Next, the epoxy resin (a2) is described.

The epoxy resin (a2) in the epoxy resin (A) is a compound having at least 2 epoxy groups containing at least 20% by weight of the basic skeleton of the epoxy resin (a1), and this epoxy resin (a2) has a weight average molecular weight of 10,000 to 100,000.

As described above, the epoxy resin (a2) has at least 20% by weight of the basic skeleton of the epoxy resin (a1).

The expression "the epoxy resin (a2) has the basic skeleton of the epoxy resin (a1)" means that the epoxy resin (a2) has a basic skeleton which is the same as that of the epoxy resin (a1).

The epoxy resin (a2) should have at least 20% by weight of the basic skeleton of the epoxy resin (a1), and the epoxy resin (a2) may have up to 100% by weight of the basic skeleton of the epoxy resin (a1).

The examples of the epoxy resin (a2) are the same as those described for the epoxy resin (a1).

Examples of the basic skeleton of the epoxy resin (a2) which is the same as that of the epoxy resin (a1) include bisphenol A skeleton, bisphenol skeleton, and copolymers thereof.

The basic skeleton of the epoxy resin (a2) which is the same as that of the epoxy resin (a1) is preferably at least one member selected from bisphenol A skeleton, bisphenol F skeleton, and copolymers thereof in view of the situation that a bisphenol A or a bisphenol F epoxy resin is often used for the epoxy resin (a1).

The epoxy resin (a2) may preferably contain at least 20% by weight of the bisphenol A-type basic skeleton when the epoxy resin (a1) is a bisphenol A epoxy resin in view of increasing affinity for the epoxy resin (a1) to thereby improve toughness of the cured product.

The epoxy resin (a2) may preferably contain at least 20% by weight of the bisphenol F-type basic skeleton when the epoxy resin (a1) is a bisphenol F epoxy resin in view of increasing affinity for the epoxy resin (a1) to thereby improve toughness of the cured product.

When the epoxy resin (a2) has the basic skeleton other than that of the epoxy resin (a1), the epoxy resin that constitutes the basic skeleton other than that of the epoxy resin (a1) is not particularly limited, and exemplary basic skeletons include those known in the art.

The epoxy resin (a2) is preferably the one having bisphenol A or bisphenol F-type basic skeleton since the epoxy resin (A) excluding the epoxy resin (a2) often has bisphenol A or bisphenol F-type basic skeleton.

When the epoxy resin (a2) is the one having bisphenol A and bisphenol F-type basic skeletons, the ratio of the bisphenol A-type basic skeleton to the bisphenol F-type basic skeleton (bisphenol A type/bisphenol F type) is preferably 10/90 to 90/10% by weight, and more preferably 20/80 to 80/20% by weight.

The epoxy resin (a2) may preferably contain 20 to 100% by weight, and more preferably 50 to 100% by weight of the basic skeleton of the epoxy resin (a1) in view of increasing toughness of the cured product.

The epoxy resin (a2) may preferably have a weight average molecular weight of 20,000 to 80,000, and more preferably 30,000 to 70,000 in view of homogeneous dissolution of the composition.

The epoxy resin (a2) is preferably solid at room temperature in view of obtaining a cured product having a higher toughness.

The epoxy resin (a2) may preferably have a softening point of at least 130° C. since such softening point facilitates high heat resistance as well as high toughness.

The epoxy resin (a2) may preferably have an epoxy equivalent of 1,000 to 8,000 g/eq, and more preferably 2,000 to 6,000 g/eq in order to prevent complete dissolution of the epoxy resin (a2) in the epoxy resin (A) before curing the composition by heating to enable formation of separate island phase (discontinuous phase) in the epoxy resin (A) after curing, and facilitate dissolution in the epoxy resin (A) during curing of the composition by heating. When the epoxy equivalent is at least 1,000 g/eq, complete dissolution of the epoxy resin (a2) in the epoxy resin (A) is prevented before curing the composition by heating to enable formation of the separate island phase (discontinuous phase) in the epoxy resin (A) after curing. When the epoxy equivalent is up to 8,000 g/eq, dissolution in the epoxy resin (A) is facilitated during curing of the composition by heating.

The epoxy resin (a2) may preferably have an average particle diameter of up to 100 μm, and preferably 5 to 100 μm in view of improving compatibility with the epoxy resin (A) during the heating and curing to thereby enable adequate adjustment of the viscosity of the composition and increase toughness.

The epoxy resins (a2) as mentioned above may be used alone or in combination of two or more.

The epoxy resin (a2) is preferably added in an amount of 2 to 20 parts by weight, and preferably 5 to 15 parts by weight in relation to 100 parts by weight of the epoxy resin (A) excluding the epoxy resin (a2) in view of maintaining tackiness and drapability.

In the composition of the present invention, the epoxy resin (A) preferably further comprises an epoxy resin (a3) having a functionality of at least 3 in view of improving the heat resistance.

Next, the epoxy resin (a3) is described.

The epoxy resin (a3) which may be incorporated in the epoxy resin (A) is not particularly limited as long as it has a functionality of at least 3.

Examples of the epoxy resin (a3) include glycidylamine epoxy resins such as N,N,N',N'-tetraglycidyldiaminodiphenylmethane (TGDDM), tetraglycidyl-m-xylylenediamine, triglycidyl-p-aminophenol, triglycidyl-p-aminocresol, and 1,3-bis(N,N-diglycidylaminomethyl)cyclohexane; and polyfunctional glycidyl ether epoxy resins such as phenol novolac epoxy resin, o-cresol novolac epoxy resin, trishydroxyphenylmethane epoxy resin, and tetraphenylolethane epoxy resin.

The preferred are triglycidyl-p-aminophenol and triglycidyl-p-aminocresol in view of easily impregnating the reinforcing fiber with the composition in the production of a fiber reinforced prepreg.

The epoxy resin (a3) may preferably have a weight average molecular weight of 250 to 1,000, and more preferably 250 to 500 in view of homogeneous dissolution of the composition.

In addition, the epoxy resin (a3) is preferably liquid in view of homogeneous dissolution of the composition, and adjusting the viscosity of the composition to an adequate range.

The epoxy resin (a3) may preferably have a viscosity at 25° C. of 5 to 50 poises, and more preferably 5 to 20 poises.

The epoxy resins (a3) as mentioned above may be used alone or in combination of two or more.

The epoxy resin (a3) is preferably included in an amount of 30 to 90 parts by weight, and more preferably 50 to 70 parts by weight in relation to 100 parts by weight of the epoxy resin (A) excluding the epoxy resin (a2) in view of enabling fillet formation.

Next, the thermoplastic resin (B) is described.

The thermoplastic resin (B) used in the composition of the present invention is not particularly limited, and examples of such thermoplastic resin (B) include polyethersulfone resin, polyetherimide resin, polyimide resin, polyamide resin, polyether resin, polyester resin, polysulfone resin, polyamide imide resin, polyacrylate resin, polyaryl ether resin, polyphenyl ether resin, and polyether ether ketone resin.

Among these, the preferred are polyethersulfone resin and polyetherimide resin in view of improving toughness of the cured product.

In view of improving compatibility with the epoxy resin (A), facilitating formation of the continuous phase, and improving toughness of the cured product, the preferred is polyethersulfone resin.

The thermoplastic resin (B) is preferably in the form of fine particles such as powder or particles in view of quick and homogeneous dissolution of the resin in the epoxy resin in the preparation of the composition to thereby prevent large grains of the thermoplastic resin (B) from remaining in the composition.

The thermoplastic resin (B) may preferably have an average particle diameter of up to 200 μm, more preferably up to 100 μm, and most preferably 5 to 80 μm in view of homogeneous dissolution in the epoxy resin (A), facilitating formation of the co-continuous phase, and improving the toughness.

The method used for producing the fine particles of the thermoplastic resin (B) is not particularly limited, and exemplary methods include those known in the art.

In the present invention, the average particle diameter of the thermoplastic resin (B) is the one measured by a particle size distribution analyzer.

In a preferred embodiment, the thermoplastic resin (B) is made up of particles of polyethersulfone resin and/or polyetherimide resin having an average particle diameter of up to 200 μm.

The thermoplastic resin (B) may preferably have a reactive functional group at a terminal of the molecule in view of increased toughness of the cured product.

Exemplary reactive functional groups include hydroxy group, carboxy group, amino group, acid anhydride group, mercapto group, and isocyanate group.

Among these, the preferred is hydroxy group in view of its high reactivity with the epoxy resin (A).

The thermoplastic resins (B) as described above may be used alone or in combination of two or more.

The thermoplastic resin (B) is preferably used in an amount of 20 to 60 parts by weight, and more preferably 30 to 50 parts by weight in relation to 100 parts by weight of the epoxy resin (A) excluding the epoxy resin (a2) in view of forming adequately shaped fillet by adjusting the viscosity and providing the prepreg with improved tackiness, drapability, and the cured product with toughness.

When the thermoplastic resin (B) is used in an amount of at least 20 parts by weight in relation to 100 parts by weight of the epoxy resin (A) excluding the epoxy resin (a2), the resulting cured product is more likely to have a morphology comprising the co-continuous phase of the epoxy resin (A) and the thermoplastic resin (B).

When thermoplastic resin (B) is used in an amount of up to 60 parts by weight in relation to 100 parts by weight of the epoxy resin (A) excluding the epoxy resin (a2), the resulting product will have improved tackiness and drapability and the fiber reinforced prepreg will have improved working efficiency.

When thermoplastic resin (B) is used in an amount of up to 60 parts by weight, the composition will have reduced viscosity with improved working efficiency.

Next, the curing agent (C) is described.

The curing agent (C) used in the composition of the present invention is not particularly limited as long as it is the one which reacts with the epoxy resin.

Exemplary such curing agents include polyamine, imidazole compound, tetramethylguanidine, thiourea added amine, polyamide, polyol, polymercaptan, polycarboxylic acid, acid anhydride, carboxylic acid hydrazide, carboxylic amide, polyphenol compound, novolac resin, and latent curing agents.

Among these, the preferred are polyamine and latent curing agents.

The polyamine used for the curing agent is not particularly limited as long as it is a compound having two or more amino groups and/or imino groups. Exemplary polyamines include aliphatic polyamine, alicyclic polyamine, and aromatic polyamine curing agents, and dicyandiamide, and among these, the preferred are aromatic polyamine curing agents in view of the heat resistance, mechanical strength, and storage stability.

The aromatic polyamine curing agent is not particularly limited as long as two or more amino groups and/or imino groups are bonded to the aromatic ring. Exemplary aromatic polyamine curing agents include diaminodiphenylsulfones such as 3,3'-diaminodiphenylsulfone (3,3'-DDS) and 4,4'-diaminodiphenylsulfone (4,4'-DDS); diaminodiphenyl ether (DADPE), bisaniline, benzyldimethylaniline, 3,3'-dichloro-4,4'-diaminodiphenylmethane (MOCA), 4,4'-diaminodiphenylmethane, 2,4'-diaminodiphenylmethane, 3,3'-diaminodiphenylmethane, 3,4'-diaminodiphenylmethane, 2,2'-diaminobiphenyl, 3,3'-diaminobiphenyl, 2,4-diaminophenol, 2,5-diaminophenol, o-phenylenediamine, m-phenylenediamine, p-phenylenediamine, 2,3-tolylenediamine, 2,4-tolylenediamine, 2,5-tolylenediamine, 2,6-tolylenediamine, 3,4-tolylenediamine, methylthiotoluenediamine, and diethyltoluenediamine.

Among these, the preferred is 3,3'-diaminodiphenylsulfone (3,3'-DDS) in view of its capability of curing by heating and improving heat resistance of the cured product.

In view of improving toughness and strength of the fillet to thereby improve self-adhesion strength of the fiber-reinforced prepreg, diaminodiphenylsulfone and/or a latent curing agent is preferably used for the curing agent (C).

The latent curing agent is not particularly limited as long as it forms a curing agent by heat or the like, and the resulting curing agent acts as a curing agent for the epoxy resin (A). Examples include organic acid dihydrazide, dicyandiamide, amineimide, tertiary amine salt, imidazole salt, Lewis acid, Broensted acid, oxazolidine compound, and ketimine compound.

The oxazolidine compound is a compound having a heterocycle which is a saturated five-membered ring containing oxygen and nitrogen, and in particular, a compound having an oxazolidine ring which opens in the presence of moisture (water). Exemplary oxazolidine compounds include N-hydroxyalkyloxazolidine and its polyisocyanate adduct, oxazolidine silyl ether, carbonate oxazolidine, and ester oxazolidine.

The ketimine compound is a compound having ketimine bond which is derived from a ketone or an aldehyde and an amine. In the present invention, the term "ketimine compound" includes an aldimine having —HC=N bond.

The ketimine compound is not particularly limited, and examples include the one derived from methyl isobutyl-ketone (MIBK) and propylene diamine; the one derived from methyl isopropyl ketone (MIPK) and/or methyl-t-butyl ketone (MTBK) and JEFFAMINE EDR148 (Mitsui Fine Chemicals, Inc.); the one derived from MIPK and/or MTBK and 1,3BAC; the one derived from MIPK and/or MTBK and norbornane diamine (NBDA); the one derived from MIPK and/or MTBK and m-xylylenediamine (MXDA); the one derived from MIPK and/or MTBK and polyamide amine; and the one derived from diethyl ketone and MXDA.

The curing agents (C) as mentioned above may be used alone or in combination of two or more.

The curing agent (C) is preferably added in an amount of 20 to 60 parts by weight, and more preferably 30 to 50 parts by weight in relation to 100 parts by weight of the epoxy resin (A) excluding the epoxy resin (a2) in view of satisfying the strength and heat resistance required for the resulting cured product as a surface plate and improved toughness.

The composition of the present invention may also contain various additives in addition to the epoxy resin (A), the thermoplastic resin (B), and the curing agent (C) as long as the merits of the composition of the present invention are not impaired.

Exemplary additives include curing catalyst such as boron trifluoride/amine salt catalyst, solid rubber, filler, antiaging agent, solvent, flame retardant, and pigment.

Examples of the boron trifluoride/amine salt catalyst include boron trifluoride/monoethyl amine, boron trifluoride/piperazine salt, and boron trifluoride/aniline salt.

The solid rubber is not particularly limited as long as it is compatible with epoxy resin (A). Exemplary solid rubbers include acrylonitrile butadiene rubber and its hydrogenated product, acrylic rubber, ethylene-acrylic rubber, epichlorohydrin rubber, and ethylene-vinyl acetate rubber.

Exemplary fillers include carbon black, calcium carbonate, titanium oxide, silica, and aluminum hydroxide.

Exemplary antiaging agents include hindered amine and hindered phenol antiaging agents.

Exemplary solvents include methanol, ethanol, propanol, methyl ethyl ketone (MEK), and methyl isobutyl ketone (MIBK).

The composition of the present invention is not particularly limited for its production method. For example, the composition of the present invention may be produced by the production method comprising the mixing step 1 of heating and melting an epoxy resin (A) and a thermoplastic resin (B) to produce a mixture, and the mixing step 2 of producing the composition by adding a curing agent (C) to the mixture followed by stirring.

First, in the mixing step 1, the epoxy resin (A) and the thermoplastic resin (B) are heated and melted to produce a mixture.

The epoxy resin (A) and the thermoplastic resin (B) are preferably melted at a temperature of 95 to 180° C., and more preferably at 100 to 130° C.

The mixing is preferably accomplished with stirring in a mixing apparatus such as a planetary mixer for 0.5 to 3 hours until the mixture becomes homogeneous.

In view of the reactivity of the composition, the thermoplastic resin (B) is preferably completely dissolved in the epoxy resin (A).

After the mixing step 1, the curing agent (C) is added to the mixture in the mixing step 2 to obtain the composition.

When the composition of the present invention further comprises an additive, such additive is added in one preferable embodiment to the mixture in this mixing step 2.

In the mixing step 2, the mixture is preferably cooled to 60 to 100° C., and more preferably 70 to 90° C. in view of suppressing increase of the viscosity of the composition.

Next, the curing agent (C) and optional additives are added to the mixture, and the mixture is blended. The order of adding each ingredient is not particularly limited.

In one preferred embodiment, the mixture is heated to 70 to 90° C. to melt ingredients and to thereby prepare a homogeneous epoxy resin composition.

It is also preferable to use a mixing apparatus such as planetary mixer to blend the mixture for 0.5 to 3 hours with stirring until the mixture becomes homogeneous.

The production method as described above is capable of reliably melting the thermoplastic resin (B) and homogeneously dissolving and/or dispersing the epoxy resin (a2) so that the cured product has a particular morphology with improved toughness and the fiber reinforced prepreg has high self-adhesion strength.

The composition of the present invention may preferably have a minimum viscosity as determined by dynamic viscoelasticity measurement at a temperature elevation rate of 2° C./min of 10 to 150 Pa·s, and more preferably 20 to 150 Pa·s in view of excellent productivity and self-adhesiveness of the fiber reinforced prepreg. When the minimum viscosity is at least 10 Pa·s, good fillet can be formed and self-adhesiveness is also improved. When the minimum viscosity is up to 150 Pa·s, the reinforcing fiber is readily impregnated with the composition in the production of the fiber reinforced prepreg while retaining the fillet forming capability.

In the present invention, the minimum viscosity as determined by dynamic viscoelasticity measurement is the minimum value of complex viscosity in the dynamic viscoelasticity measurement that was made using the composition of the present invention as a sample at a temperature in the range of 25 to 200° C. at a temperature elevation rate of 2° C./min at a frequency of 10 rad/s and strain of 1%.

The composition of the present invention is not limited for its usage.

For example, the temperature used in curing the composition of the present invention is preferably 70 to 200° C., and more preferably 120 to 180° C. in view of improving toughness of the cured product.

The pressure is preferably 1.5 to 4.0 kg/cm$^2$, and more preferably 2.5 to 3.5 kg/cm$^2$ in view of improving toughness of the cured product.

The time is preferably 1 to 8 hours.

The composition of the present invention can be cured by semi-curing the composition and further curing the semi-cured composition to produce the cured product.

The semi-curing of the composition of the present invention is preferably accomplished at 50 to 200° C., and more preferably at 70 to 180° C. in view of improving toughness of the cured product.

The pressure is preferably 1.5 to 4.0 kg/cm$^2$, and more preferably 2.5 to 3.5 kg/cm$^2$ in view of improving toughness of the cured product.

The time is preferably 1 to 8 hours.

The semi-cured composition may be cured, for example, under the conditions as described above.

When the composition of the present invention is cured, the resulting cured product will have a co-continuous phase of the epoxy resin (A) and the thermoplastic resin (B) and/or a continuous phase of the thermoplastic resin (B).

When the cured product has a co-continuous phase of the epoxy resin (A) and the thermoplastic resin (B), both the epoxy resin (A) and the thermoplastic resin (B) will form a continuous phase.

When the cured product has a continuous phase of the thermoplastic resin (B), the epoxy resin (A) will have the island phase. In other words, the cured product will have a morphology of reversed sea-island structure.

When the cured product has a co-continuous phase of the epoxy resin (A) and the thermoplastic resin (B) and a continuous phase of the thermoplastic resin (B), it means that the cured product has the co-continuous phase of the epoxy resin (A) and the thermoplastic resin (B) and the continuous phase of the thermoplastic resin (B), respectively.

In the morphology of the cured product, the epoxy resin (a2) may be dissolved and/or dispersed in the epoxy resin (A).

When the epoxy resin (a2) is dispersed in the epoxy resin (A), the epoxy resin (a2) will form the island phase in the matrix resin of the epoxy resin (A).

When the epoxy resin (a2) forms the island phase, the island phase may preferably have an average particle diameter of 0.1 to 2 μm, and more preferably 0.1 to 0.5 μm in view of improving the toughness of the cured product.

When cured, the epoxy resin composition for a fiber reinforced composite material of the present invention will have a co-continuous phase of the epoxy resin (A) and the thermoplastic resin (B) and/or a continuous phase of the thermoplastic resin (B), with the particles of the epoxy resin (a2) dispersing in the epoxy resin (A). The epoxy resin (a2) may also be dissolved in the epoxy resin (A).

When the epoxy resin (a2) is dispersed and/or dissolved in the epoxy resin (A), the cured product will have a higher toughness. Such improvement in the toughness results in the increase of the fillet strength and self adhesion strength of the fiber reinforced prepreg.

The fracture toughness measured according to ASTM D5045-99 after curing the composition of the present invention is preferably at least 2.0 MPa·m$^{1/2}$, and more preferably 2.0 to 2.5 MPa·m$^{1/2}$ in view of increasing the toughness of the cured product and increasing peel strength in the peeling test after self-adhesion of the surface plate (fiber reinforced prepreg) to other member (for example, a honeycomb core).

The composition of the present invention can be used, for example, for a matrix resin of a fiber reinforced prepreg.

Next, the fiber reinforced prepreg of the present invention is described.

The fiber reinforced prepreg of the present invention is a prepreg prepared by combining a reinforcing fiber with the epoxy resin composition for a fiber reinforced composite material of the present invention serving as the matrix resin.

The composition used for the matrix resin in the fiber reinforced prepreg of the present invention is not particularly limited as long as it is the composition of the present invention.

The reinforcing fiber used in the fiber reinforced prepreg of the present invention is not particularly limited, and exemplary reinforcing fibers include those known in the art. Among these, at least one member selected from carbon fiber, glass fiber, and aramid fiber is preferably used in view of the strength, and the most preferred is use of carbon fiber.

Exemplary aramid fibers include Kevler.

The fiber is not particularly limited for its form, and exemplary fibers include woven fabric and unidirectional fabric.

The fiber weight per unit area is preferably 140 to 200 g/m$^2$.

Exemplary commercially available fibers include carbon fiber T-300 manufactured by Toray Industries, Inc. and carbon fiber HTA grade manufactured by Toho Tenax Co., Ltd.

The method used for combining the epoxy resin composition for a fiber reinforced composite material with the reinforcing fiber is not particularly limited. Typical methods include impregnation and coating of the reinforcing fiber with the epoxy resin composition for a fiber reinforced composite material.

The fiber reinforced prepreg of the present invention is not particularly limited for its production method. For example, it can be produced by impregnating the reinforcing fiber with the epoxy resin composition for a fiber reinforced composite material, or by laminating two or more layers of the reinforcing fiber impregnated with the epoxy resin composition for a fiber reinforced composite material.

The impregnation of the fiber with the epoxy resin composition for a fiber reinforced composite material may be accomplished by wet method using a solvent or by hot melt method using no solvent.

When the prepreg is produced by the wet method, the epoxy resin composition for a fiber reinforced composite material is dissolved in a solvent to prepare a varnish used for the impregnation.

Exemplary solvents used in preparing the varnish include alcohols such as methanol, ethanol, and propanol, and ketones such as methyl ethyl ketone (MEK).

The solvent may be used in an amount of 100 to 200 parts by weight in relation to 100 parts by weight of the solid content of the epoxy resin composition for a fiber reinforced composite material in view of reducing the time required for drying.

The content of the matrix resin in the fiber reinforced prepreg of the present invention is preferably 30 to 50% by weight, and more preferably 35 to 45% by weight of the fiber reinforced prepreg in view of improving self-adhesion, working efficiency, aesthetic quality, and mechanical properties of the fiber reinforced prepreg.

The fiber reinforced prepreg of the present invention is not particularly limited for the method of its use, and for example, the fiber reinforced prepreg of the present invention may be cured directly, or by semi-curing followed by further curing.

The conditions used for the curing are the same as those described above.

The fiber reinforced prepreg of the present invention is not limited for its usage. For example, the fiber reinforced prepreg of the present invention can be cured to produce a fiber reinforced composite material which is known in the art. Exemplary usages include motorcycle parts such as motorcycle frame, cowl, and fender; automobile parts such as door, bonnet, tail gate, side fender, side panel, fender, energy absorber, trunk lid, hardtop, side mirror cover, spoiler, diffuser, ski carrier, engine cylinder cover, engine hood, chassis, air spoiler, and propeller shaft; car shell parts such as front car's nose, roof, side panel, door, chassis cover, and side skirt; railroad car parts such as baggage rack and seat; parts for automobiles and motorcycles such as interior, inner and outer panels of the wing in a wing track, roof, and floor, aero parts such as side skirt; aircraft parts such as window frame, baggage rack, seat, floor panel, wing, propeller, and body; casings of a laptop PC, mobile phone, and the like; medical applications such as X-ray cassette and table; audio parts such as flat speaker panel and speaker cone; sporting goods such as golf head, face plate, snowboard, surfboard, and protector; general industrial applications such as leaf spring, windmill blade, and elevator (basket panel and door).

The fiber reinforced prepreg of the present invention can be also used for producing a fiber reinforced composite material by laminating the fiber reinforced prepreg with other components (for example, a honeycomb core). Exemplary fiber reinforced composite materials produced by laminating the fiber reinforced prepreg of the present invention with other components include a honeycomb sandwich panel.

The fiber reinforced prepreg of the present invention prepared by using the composition of the present invention exhibits high self adhesion strength and the fillet formed has high toughness and strength, and the prepreg also has excellent tackiness, drapability, productivity, and working efficiency.

The fiber reinforced composite material produced by using the fiber reinforced prepreg of the present invention can be adhered to another component without using an adhesive, and the fiber reinforced prepreg has excellent smoothness and improved outer appearance and surface property with reduced porosity (surface irregularities).

Next, the honeycomb sandwich panel according to the present invention is described.

The honeycomb sandwich panel of the present invention is the one produced by laminating the fiber reinforced prepreg of the present invention with a honeycomb core, and curing the laminate.

The fiber reinforced prepreg used in the honeycomb sandwich panel of the present invention is not particularly limited as long as it is a fiber reinforced prepreg of the present invention. Since the fiber reinforced prepreg used in the honeycomb sandwich panel of the present invention has excellent adhesiveness, it can be adhered to the honeycomb core without using an adhesive and the fillet formed in the course of producing the honeycomb sandwich panel will exhibit high strength.

The honeycomb core used in the honeycomb sandwich panel of the present invention is not particularly limited, and the honeycomb core may be, for example, at least one member selected from the group consisting of aramid honeycomb core, aluminum honeycomb core, paper honeycomb core, and glass honeycomb core.

The size of the hexagonal prism constituting the honeycomb core structure is not particularly limited. However, the honeycomb core preferably has a cell size of ⅛ to ⅜ inch in view of its strength and reduced weight.

The honeycomb sandwich panel of the present invention is not particularly limited for its production method.

Next, an embodiment of the method for producing the honeycomb sandwich panel of the present invention is described by referring to the attached drawings.

Figure 3:
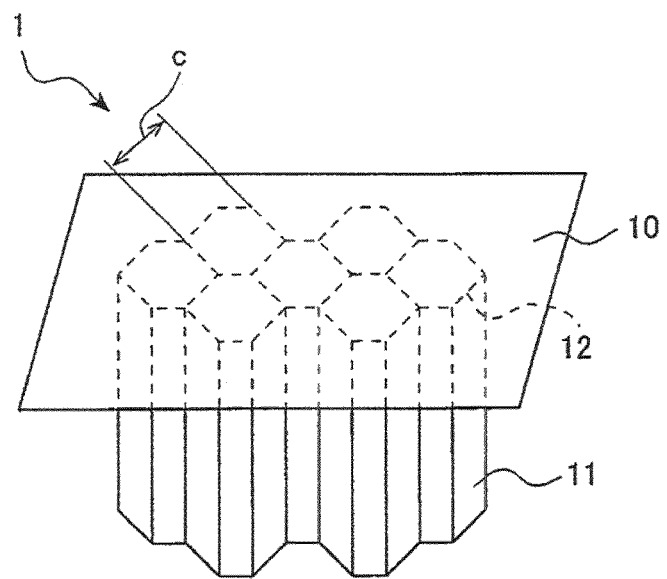
FIG. 3 is a perspective view schematically showing an embodiment of the honeycomb sandwich panel of the present invention.

FIG. 3 is a perspective view schematically showing an embodiment of the honeycomb sandwich panel of the present invention.

Figure 4:
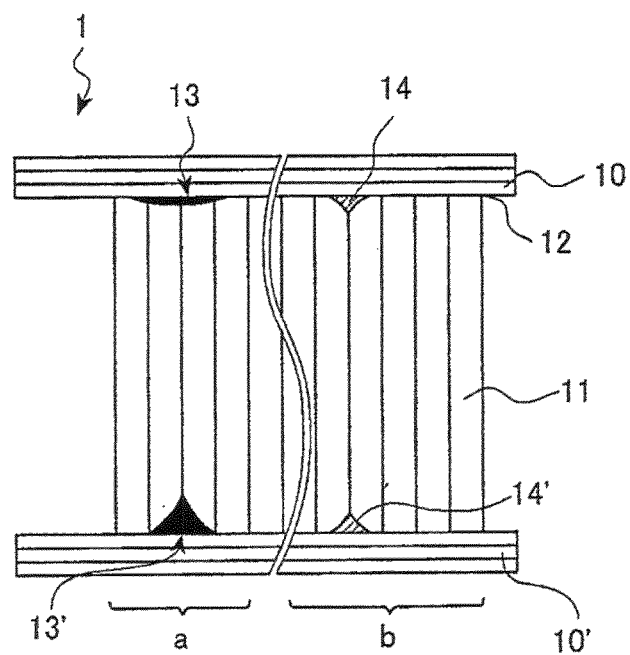
FIG. 4 is a cross sectional view of a honeycomb sandwich panel schematically showing the cross section taken in the direction parallel to the side surface of the prism of the honeycomb core.

FIG. 4 is a cross sectional view of a honeycomb sandwich panel schematically showing the cross section taken in the direction parallel to the side surface of the prism of the honeycomb core. Part a of FIG. 4 shows a honeycomb sandwich panel prepared by adhering a fiber reinforced prepreg formed from a conventional resin composition for the prepreg sheet. Part b of FIG. 4 shows an embodiment of the honeycomb sandwich panel of the present invention.

In FIG. 3, a honeycomb sandwich panel 1 is produced by adhering a fiber reinforced prepreg 10 to a honeycomb core 11. More particularly, the honeycomb sandwich panel 1 can be produced by adhering the fiber reinforced prepreg 10 formed from the composition of the present invention to one or both of opposite ends 12 of the honeycomb core 11 having a honeycomb structure, and heating and curing the assembled panel in an autoclave or the like while applying pressure from both ends of the panel.

As shown in FIG. 4, when the fiber reinforced prepreg is the one prepared by using the conventional composition for the epoxy resin composition for the fiber reinforced composite material, problems such as failure of fillet formation on the upper surface 13 due to the flowing of the entire epoxy resin composition for a fiber reinforced composite material down to the lower surface 13' and generation of spaces (unadhered areas) between the fiber reinforced prepreg 10 and the honeycomb core 11 may arise in the course of curing by heating even if equal pressure is applied to the fiber reinforced prepreg 10 and the honeycomb core 11 (see the part a of FIG. 4).

In contrast, when the composition of the present invention is used, the fiber reinforced prepreg 10 and the honeycomb core 11 are completely adhered as shown in the part b of FIG. 4. Also, excessive flowing out of the epoxy resin composition for the fiber reinforced composite material from the fiber reinforced prepreg that would leave no resin component in the fiber reinforced prepreg will be avoided, and an adequate amount of composition will remain in the fiber reinforced prepreg.

As a consequence, curing can be completed while the upper fillets 14 retain their adequate shape. Lower fillets 14' are also formed on the lower surface by the surface tension upon decrease in the viscosity, and adequate amount of the epoxy resin composition for the fiber reinforced composite material will remain in the fiber reinforced prepreg.

The temperature used for adhering the fiber reinforced prepreg 10 and the honeycomb core 11 is preferably 50 to 200° C., and more preferably 70 to 190° C. in view of improving heat resistance of the cured product.

In one preferred embodiment, the adhesion of the fiber reinforced prepreg 10 and the honeycomb core 11 is accomplished under the curing conditions of elevating the temperature to 150-185° C. at a rate of 2 to 5° C./min while applying a pressure of 2.5 to 4.0 kg/cm$^2$, retaining the temperature at 150 to 185° C. for 1 to 2 hours, and lowering the temperature to room temperature at a rate of 2 to 5° C./min.

The honeycomb sandwich panel of the present invention can be produced by the procedure as described above.

The honeycomb sandwich panel of the present invention is excellent in fillet formation, fillet strength, mechanical strength, and working efficiency.

The honeycomb sandwich panel of the present invention may be used, for example, as a structural material in aircrafts and automobiles.

The conventional fiber reinforced prepreg had a drawback that, when the honeycomb core and the fiber reinforced prepreg are directly adhered, the fillet formed at the juncture between the honeycomb core and the fiber reinforced prepreg had low strength and insufficient toughness.

In contrast, the honeycomb sandwich panel of the present invention is produced by using the fiber reinforced prepreg that has been produced by using the composition of the present invention for the matrix resin composition, and as a consequence, the cured composition has high toughness, and this high toughness contributes to the high strength of the fillet.

Presumably, this can be ascribed to the situation that, in the composition of the present invention, the epoxy resin (a2) has a high affinity for the epoxy resin (a1) since it contains at least 20% by weight of the basic skeleton of the epoxy resin (a1), and as a consequence, the resulting cured product has a high toughness.

EXAMPLES

Next, the present invention is described in further detail by referring to the Examples, which by no means limit the scope of the present invention.

1. Preparation of the Epoxy Resin Composition for a Fiber Reinforced Composite Material The ingredients shown in Table 1 except the curing agent were blended in a blender in the amounts (unit, parts by weight) shown in Table 1 while heating to a temperature of 130° C. Next, the resulting mixture was cooled to 70° C., and the curing agent was added in the amount (unit, parts by weight) shown in Table 1. The mixture was blended while heating to a temperature of 70° C. to prepare the epoxy resin composition for a fiber reinforced composite material.

2. Preparation of the Fiber Reinforced Prepreg

The resulting composition was coated on a release sheet using a reverse roll coater to prepare the resin film. Next, a unidirectional prepreg was prepared by using two of the thus prepared resin films and a carbon fiber [Torayca (registered trademark) T-700; manufactured by Toray Industries, Inc.; tensile modulus, 230 GPa, this also applies to the following description] arranged in one direction in the form of a sheet. More particularly, the carbon fiber sheet was sandwiched between the resin films, and pressure was applied to the laminate under heating to impregnate the carbon fiber with resin to thereby prepare a unidirectional prepreg having an areal weight of 196±5 g/cm$^2$ and a weight ratio of the matrix resin of 40%.

3. Preparation of the Honeycomb Sandwich Panel

The resulting composition was used to prepare two prepregs in the same manner as above, and an aramid honeycomb core (SAH-⅛ inch-8.0; thickness, 12.7 mm; manufactured by Showa Aircraft Industry Co., Ltd.) was sandwiched between the thus prepared prepregs. The temperature of the laminate was elevated from 70° C. to 180° C. at a temperature elevation rate of 2° C./min, and kept at 180° C. for 2 hours for curing while applying a pressure of 3.2 kgf/cm$^2$ to thereby produce a honeycomb sandwich panel.

4. Evaluation

The fiber reinforced prepreg prepared as described above was evaluated for its tackiness and drapability. The results are shown in Table 1.

The composition prepared as described above was also cured under the conditions as described below to produce a cured product to thereby measure its fracture toughness. The morphology of the cured product was observed. The results are shown in Table 1.

The honeycomb sandwich panel prepared as described above was also measured for its peel strength by a climbing drum peel (CDP) test. The results are shown in Table 1.

(1) Tackiness

Two prepregs were placed on top of one another to prepare a plate having a thickness of about 0.5 mm, and tackiness was evaluated in the environment of 25° C. by touching with a finger.

The tackiness was evaluated by the criteria in which tackiness of the prepregs of Comparative Examples 1 and 2 was rated "5" with a larger value indicating a higher tackiness.

(2) Drapability

The prepreg was manually bent to evaluate the drapability (flexibility of the prepreg) in an environment of 25° C. by touching with a finger.

The drapability was evaluated by the criteria in which drapability of the prepregs of Comparative Examples 1 and 2 was rated "5" with a larger value indicating a higher drapability.

(3) Fracture toughness ($K_{1C}$)

A resin plate having a thickness of 7 mm was formed on a release paper by using the composition prepared as described above, and this resin plate was cured in an autoclave by elevating temperature from 70° C. to 180° C. at a temperature elevation rate of 2° C./min and maintaining the temperature at 180° C. and the pressure at 0.32 MPa for 2 hours to thereby produce a cured plate having a thickness of 7 mm.

A test sample was prepared from the thus obtained cured plate, and fracture toughness (stress intensity factor; unit, MPa·m$^{1/2}$) was measured under the condition of room temperature (25° C.) according to ASTM D-5045-99.

(4) Morphology after Curing

The cross section of the broken test sample after the measurement of the fracture toughness was observed with a transmission electron microscope (TEM; trade name, M-800; manufactured by Hitachi, Ltd.; the same applies for the following description).

In the observation, the morphology of the cured product was indicated as "co-continuous" when both the epoxy resin (A) and the thermoplastic resin (B) formed a continuous phase.

The morphology of the cured product was indicated as "reversed sea-island" when the island phase (discontinuous phase) of the epoxy resin (A) was dispersed in the continuous phase of the thermoplastic resin (B).

FIG. 1 shows the photograph of the cross section of the test sample of Comparative Example 1 taken by the transmission electron microscope at a magnification of 5,000×.

Figure 2:
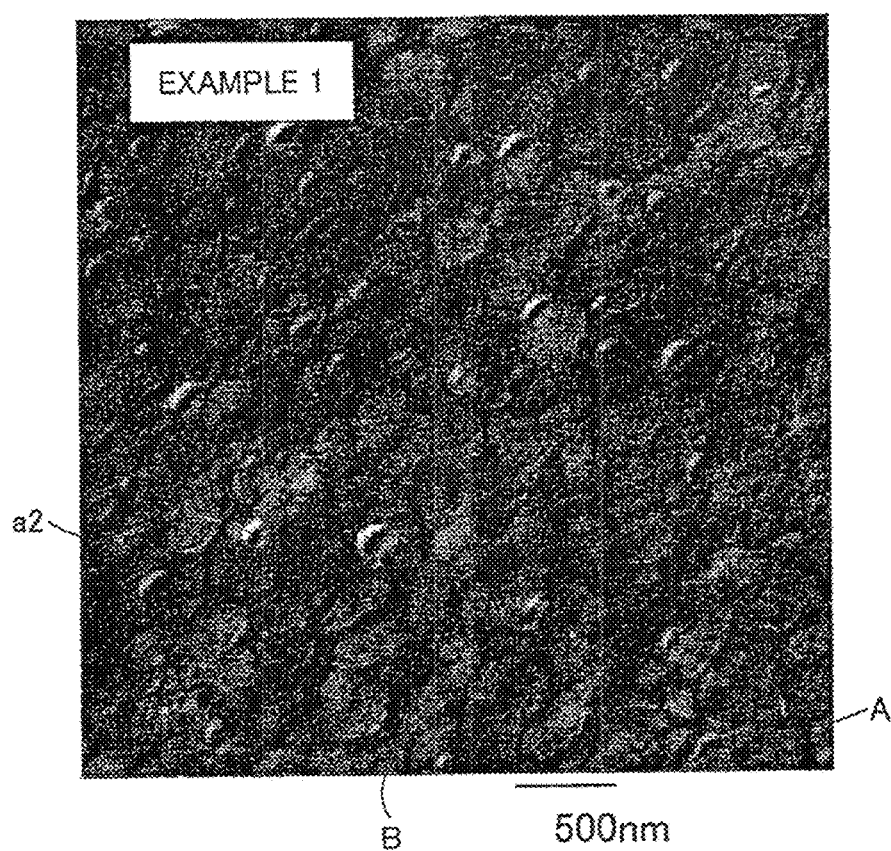
FIG. 2 is a photograph of a cross section of the test sample of Example 1 taken by a transmission electron microscope at a magnification of 5,000×.

FIG. 2 shows the photograph of the cross section of the test sample of Example 1 taken by the transmission electron microscope at a magnification of 5,000×.

(5) Peel Strength Measured by CDP Test

A climbing drum peel (CDP) test was conducted according to ASTM D1781 by using the thus obtained honeycomb sandwich panels.

TABLE 1

|  | Comparative Example | | Example | | |
| --- | --- | --- | --- | --- | --- |
|  | 1 | 2 | 1 | 2 | 3 |
| Epoxy resin 1 | 60 | 60 | 60 | 60 | 60 |
| Epoxy resin 2 | 40 | 40 | 40 | 40 | 40 |
| Thermoplastic resin | 45 | 45 | 45 | 45 | 45 |
| Epoxy resin 3 | 10 | — | — | — | — |
| Epoxy resin 4 | — | 10 | — | — | — |
| Epoxy resin 5 | — | — | 10 | — | — |
| Epoxy resin 6 | — | — | — | 10 | — |
| Epoxy resin 7 | — | — | — | — | 10 |
| Curing agent | 40 | 40 | 40 | 40 | 40 |
| Tackiness of the resin | 5 | 5 | 5 | 5 | 5 |
| Drapability of the resin | 5 | 5 | 5 | 5 | 5 |
| Morphology after curing | Reversed sea-island | Co-continuous | Co-continuous | Co-continuous | Co-continuous |
| $K_{IC}$ (unit: MPa/m$^{1/2}$) | 1.90 | 1.93 | 2.20 | 2.22 | 2.25 |
| Peel strength measured by CDP test (unit: lb-in/3 in) | 22.5 | 22.6 | 24.7 | 24.4 | 25.2 |

The ingredients shown in Table 1 are as described below.

Epoxy resin 1: triglycidyl-p-aminophenol; trade name, MY-0510; manufactured by Huntsman Advanced Materials Epoxy resin 2: bisphenol F diglycidyl ether represented by the following formula (1); trade name, jER806; manufactured by Japan Epoxy Resins Co., Ltd.

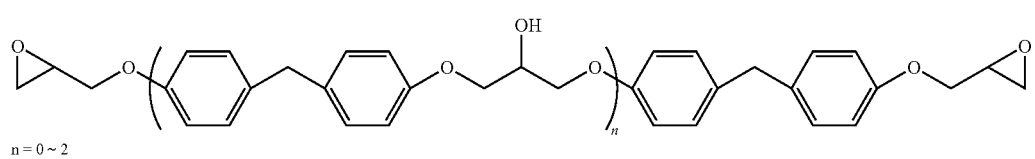

(1)

n = 0 ~ 2

Thermoplastic resin: polyethersulfone resin (average particle diameter, 50 μm); trade name, Sumikaexel PES5003P; manufactured by Sumitomo Chemical Co., Ltd.

Epoxy resin 3: solid bisphenol A epoxy resin; weight average molecular weight, 20,000; average particle diameter, 15 μm; trade name, YDF-020N; manufactured by Tohto Kasei Co., Ltd.

Epoxy resin 4: bisphenol A phenoxy resin weight average molecular weight, 56,000; trade name, jER1256; manufactured by Japan Epoxy Resins Co., Ltd.

Epoxy resin 5: bisphenol A/bisphenol F (25/75, % by weight) mixed phenoxy resin; weight average molecular weight, 60,000; trade name, jER4275; manufactured by Japan Epoxy Resins Co., Ltd.

Epoxy resin 6: bisphenol A/bisphenol F (50/50, % by weight) mixed phenoxy resin; weight average molecular weight, 53,000; trade name, jER4250; manufactured by Japan Epoxy Resins Co., Ltd.

Epoxy resin 7: solid bisphenol F epoxy resin; weight average molecular weight, 42,000; trade name, jER4010P; manufactured by Japan Epoxy Resins Co., Ltd.

Curing agent: 3,3'-diaminodiphenylsulfone; trade name, 3,3'-DDS; manufactured by Huntsman Advanced Materials As demonstrated in the results shown in Table 1, Comparative Examples 1 and 2 in which the composition did not contain the epoxy resin (a2) exhibited low fracture toughness and low peel strength as measured by CDP.

In contrast, Examples 1 to 3 exhibited a fracture toughness higher than that of Comparative Examples 1 and 2 indicating the superior toughness of the cured product.

Examples 1 to 3 also exhibited higher peel strength as measured by CDP compared to Comparative Examples 1 and 2, indicating superior strength of the fillet.

Presumably, such morphology has been realized in the cured products produced by using the compositions of Examples 1 to 3 since the epoxy resin (a2) has a higher affinity for the epoxy resin (A), and the epoxy resin (a2) is easily dispersed in the epoxy resin (A), and as a consequence, the epoxy resin (a2) has a smaller particle diameter.

The smaller particle diameter of the epoxy resin (a2) and the higher dispersibility of the epoxy resin (a2) in the epoxy resin (A) are demonstrated in FIG. 2 of the attached drawings.

In FIG. 2, the dark colored area (B) corresponds to the thermoplastic resin (B), the gray area (A) corresponds to the epoxy resin (A), and the white island phase (a2) in the epoxy resin (A) corresponds to the epoxy resin (a2). The cured product of Example 1 has a morphology such that the epoxy resin (A) and the thermoplastic resin (B) have a co-continuous phase, and the epoxy resin (a2) is dispersed in the continuous phase of the epoxy resin (A).

On the other hand, in FIG. 1, the dark colored area (B) corresponds to the thermoplastic resin (B), the gray area (A) corresponds to the epoxy resin (A), and the white island phase (a2) in the epoxy resin (A) corresponds to the epoxy resin (a2). The cured product of Comparative Example 1 has a morphology of reversed sea-island structure comprising continuous phase of the thermoplastic resin (B) and island phase of the epoxy resin (A) in which the island phase of the epoxy resin (a2) is dispersed in the epoxy resin (A).

When the size of the epoxy resin (a2) is compared in FIG. 1 and FIG. 2, the epoxy resin (a2) in FIG. 2 is smaller and more dispersed than the epoxy resin (a2) in FIG. 1.

As described above, in the composition of the present invention, the epoxy resin (a2) which has a high affinity for the epoxy resin (A) is fully dispersed and/or dissolved in the epoxy resin (A), and as a consequence, the cured product has a high toughness to effectively alleviate the stress applied from outside.

INDUSTRIAL APPLICABILITY

The epoxy resin composition for a fiber reinforced composite material of the present invention can provide a cured product having a high toughness.

The invention claimed is:

1. A fiber reinforced prepreg produced by combining a reinforcing fiber with the epoxy resin composition for a fiber reinforced composite material, serving as a matrix resin:
the epoxy resin composition for the fiber reinforced composite material comprising:
an epoxy resin (A) comprising an epoxy resin (a1) having a weight average molecular weight of up to 1,000 and an epoxy resin (a2) having a weight average molecular weight of 42,000 to 60,000 which contains at least 20% by weight of the basic skeleton of the epoxy resin (a1),
a thermoplastic resin (B), and
a curing agent (C),
wherein the basic skeleton of the epoxy resin (a1) is bisphenol F, and the basic skeleton in the epoxy resin (a2) is bisphenol F or a copolymer of bisphenol A and bisphenol F, and
wherein the thermoplastic resin (B) is polyethersulfone resin, and
wherein the cured composition has a co-continuous phase of the epoxy resin (A) and the thermoplastic resin (B) and the epoxy resin (a2) having smaller particle size compared to the epoxy resin (A) is dispersed in the continuous phase of the epoxy resin (A), and
the epoxy resin (a2) is added in an amount of 5 to 15 parts by weight in relation to 100 parts by weight of the epoxy resin (A) excluding the epoxy resin (a2).

2. The fiber reinforced prepreg according to claim 1, wherein the matrix resin is included in an amount of 30 to 50% by weight of the fiber reinforced prepreg.

3. The fiber reinforced prepreg according to claim 1, wherein the reinforcing fiber is at least one member selected from the group consisting of carbon fiber, glass fiber and aramid fiber.

4. The fiber reinforced prepreg according to claim 1, wherein the epoxy resin (a1) is included in an amount of 7 to 70 parts by weight in relation to 100 parts by weight of the epoxy resin (A) excluding the epoxy resin (a2).

* * * * *